United States Patent [19]

Schaefer

[11] 4,433,530
[45] Feb. 28, 1984

[54] INTERLOCK MECHANISM PREVENTING ENGINE STARTING WHEN A MOWER IS IN POWER DRIVE

[75] Inventor: Daniel W. Schaefer, Port Washington, Wis.

[73] Assignee: Simplicity Manufacturing, Inc., Port Washington, Wis.

[21] Appl. No.: 422,152

[22] Filed: Sep. 23, 1982

[51] Int. Cl.³ .................... A01D 69/08; A01D 53/08
[52] U.S. Cl. ............................ 56/11.8; 56/DIG. 18; 56/10.8; 56/10.5; 123/179 SE
[58] Field of Search .................. 56/10.2, 10.5, 11.3, 56/11.7, 11.8, DIG. 18, 10.8; 123/198 D; 180/19 H

[56] References Cited

FOREIGN PATENT DOCUMENTS 1000956 12/1976 Canada ................ 56/DIG. 18
47417 3/1982 Fed. Rep. of Germany ....... 56/10.5
2391639 1/1979 France ........................ 56/DIG. 18

Primary Examiner—Gene Mancene
Assistant Examiner—John Weiss
Attorney, Agent, or Firm—James E. Nilles

[57] ABSTRACT

A walk-behind vehicle in the form of a mower (11) is provided with an interlock mechanism (31, 68, 61 or 131, 158, 161) which prevents operation of a pull cable (51 or 151) to start an engine (21) when the mower power drive (22) is in a drive establishing condition.

9 Claims, 5 Drawing Figures

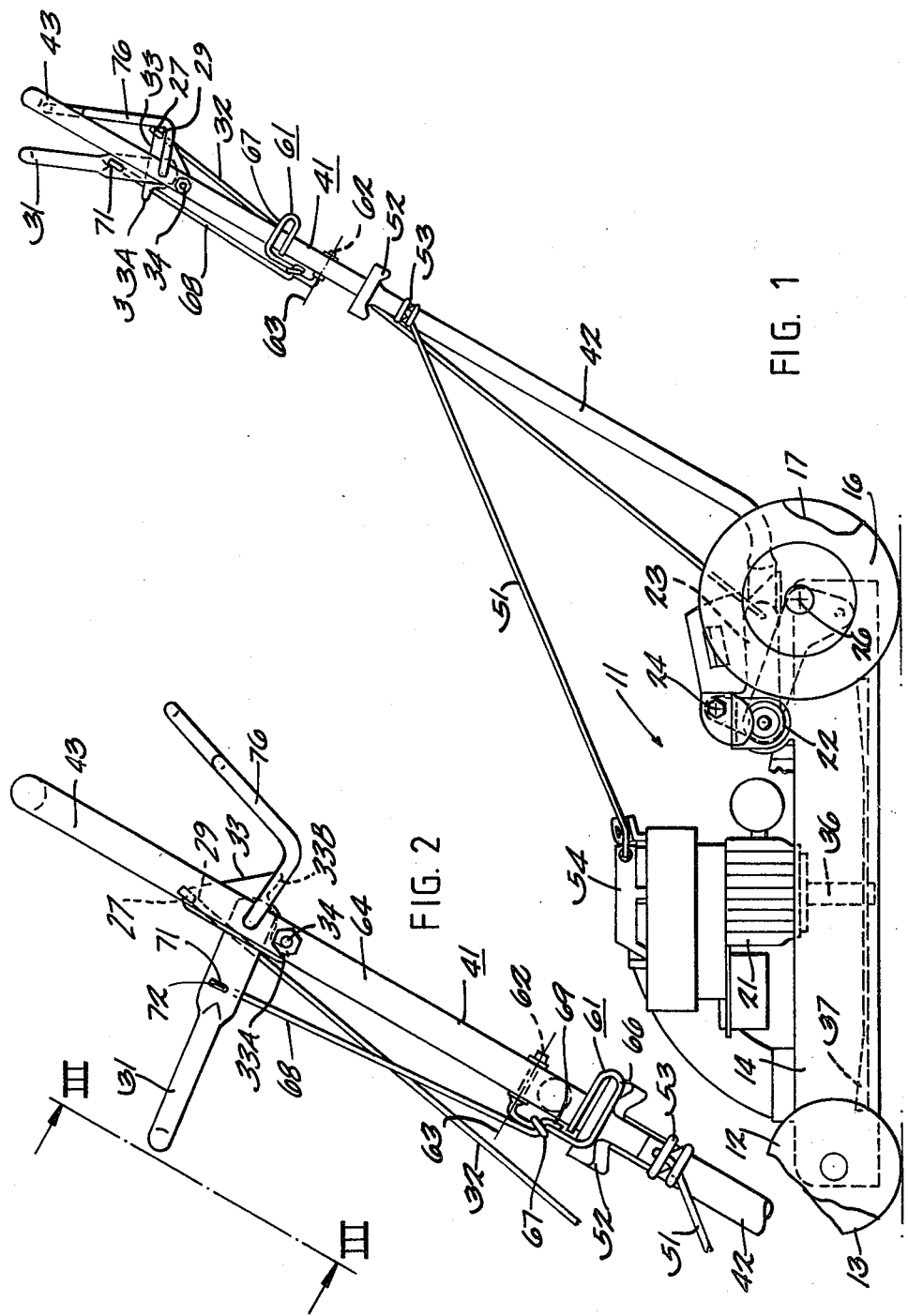

INTERLOCK MECHANISM PREVENTING ENGINE STARTING WHEN A MOWER IS IN POWER DRIVE

BACKGROUND OF THE INVENTION

1. Technical Field

This invention relates to lawn and garden equipment utilizing an engine which is started by pulling a recoil starter cable.

2. Prior Art

Heretofore, others have provided interlock mechanisms to prevent starting an engine when the vehicle transmission is in a drive mode. Such devices are common on currently produced automobiles. However, the use of a stop device which physically prevents the grip of a starter pull cable for a vehicle engine from being pulled when the vehicle is in a power drive condition is believed to be novel.

BRIEF DESCRIPTION OF THE INVENTION

This invention is particularly useful in a wheeled vehicle powered by an internal combustion engine which is started by pulling a cable attached to a recoil mechanism and which has a clutch device in the power train connecting the engine to at least one of the wheels. A manually operated retractable pull cable is connected at one of its ends to the recoil starter and has a hand grip at its other end which the operator pulls to start the engine. The vehicle may take the form of a walk-behind unit having a rearwardly extending control handle on which a seat may be mounted for supporting the grip of the pull cable when the latter is retracted. A control is provided for the clutch device by which the vehicle operator may selectively cause the clutch device to be in either its drive establishing position or its drive disestablishing position. A blocking member is mounted on the vehicle near the pull cable grip which is shiftable between a release position in which manual gripping and pulling of the grip is unhindered by the blocking member and a blocking position in which manual gripping and pulling of the grip is hindered by the blocking member. Means responsive to operation of the clutch device are provided to cause the blocking member to occupy its release position when the clutch device is in its drive disestablishing position and to occupy its blocking position when the clutch device is in its drive establishing condition. The clutch control element and blocking member may be pivotally mounted on the control handle and the means operative to operation of the clutch device may include a link interconnecting the clutch control element and the blocking member. The seat for the grip may take the form of an eyelet formed by bending a rod in the shape of a helical coil. This configuration permits the cable to be threaded through the eyelet without actually passing an end of the cable therethrough. The grip may include a stem which extends into the eyelet. Preferably, the position of the seat on the control handle permits the operator to stand at the rear of the control handle when pulling the pull cable grip to start the engine.

BRIEF DESCRIPTION OF THE DRAWINGS

Two embodiments of the invention are illustrated in the drawings wherein:

FIG. 1 is a side view of a walk-behind mower incorporating one embodiment of the invention;

FIG. 2 is an enlarged partial side view of the mower shown in FIG. 1 with the manually operated clutch element moved to a drive establishing condition of adjustment;

DETAILED DESCRIPTION OF THE DRAWINGS

Figure 3:
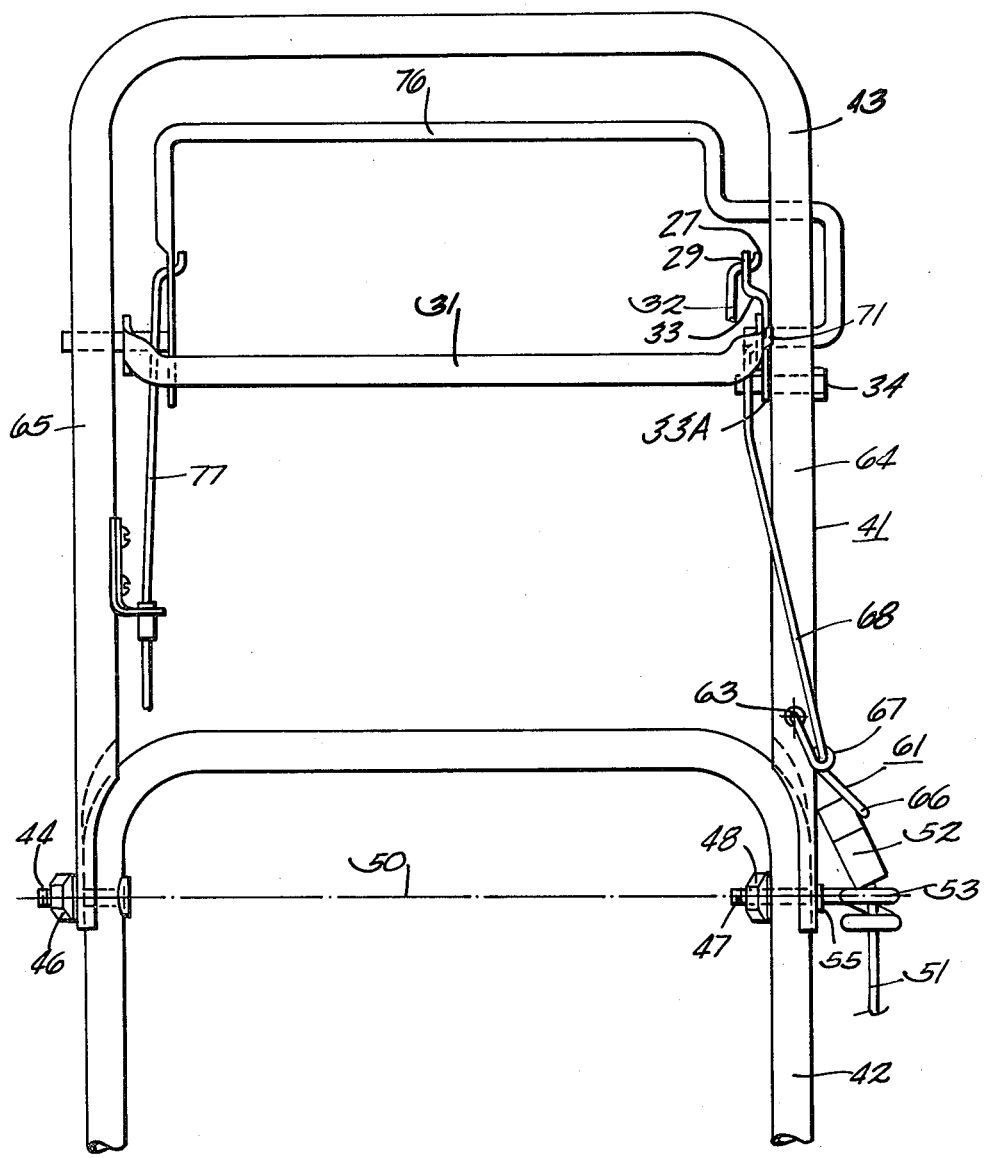
FIG. 3 is a view taken along the line III—III in FIG. 2.

Referring to FIG. 1, a walk-behind vehicle in the form of a mower 11 is illustrated which has a pair of front wheels 12, 13 supporting a front end of a housing 14 and a pair of rear wheels 16, 17 which support the rear of the housing 14 and which are driven by the mower's internal combustion engine 21 through a drive train, not shown, which includes a pair of friction wheels 22. Only one of the friction wheels 22 is shown in FIG. 1 together with its mounting lever 23 which pivots about an axis 24 spaced from the axis 26 of the wheels 16, 17. When a manually operated control element or clutch handle 31 is moved from its detented clutch disengaged or drive disestablishing position shown in FIG. 1 to its detented drive establishing or clutch engaged position shown in FIG. 2, a control rod 32 interconnecting the control element 31 and the lever 23 will cause the latter to pivot about the axis 24 to bring the friction wheels 22 into driving engagement with the outer periphery of the rear wheels 16, 17 of the walk-behind mower 11. As FIGS. 1, 2 and 3 show, the upper end of control rod 32 has a dogleg portion 27 which is inserted into an opening 29 in a rigid plate 33 which is secured to, as by welding, and movable with clutch handle 31. As FIGS. 1, 2 and 3 show, clutch handle 31 and attached plate 33 pivot around the same pivot point as an engine shut-off lever 76, hereinafter described. Plate 33 has projections 33A and 33B which alternatively engage a bolt 34 through control handle 41 to limit the fore and aft travel of clutch handle 31, as comparison of FIGS. 2 and 1 show. The engine includes a downwardly extending drive shaft 36 to which a mower blade 37 is connected for rotation therewith. An operator's control handle 41 is provided which includes a lower U-shaped portion 42 which has the lower front ends of its legs attached to the mower housing 14. The mower handle 41 also includes an upper U-shaped portion 43 whose leg 65 is releasably connected to the lower portion 42 by a bolt 44 and a nut 46 and whose leg 64 is releasably connected to the lower portion 42 by a bolt 47 of special construction and a nut 48. The bolts 44, 47 are aligned on a transverse axis 50 and pass through suitable aligned openings in the legs of the U-shaped handle portions 42, 43. The engine 21 is of the recoil start type and has a recoil mechanism 54 at its top to which one end of a pull cord or cable 51 is connected. A T-shaped grip 52 is connected to the free end of the cable 51 and is positioned on the handle 41 at a point convenient for starting the engine when the operator is in a standing position at the rear of the mower. The grip 52 rests on a seat in the form of an eyelet 53 integrally formed on the laterally outer end of the bolt 47. The eyelet 53 is formed by bending the shank or rod of the bolt 47 into a helical coil which permits the rope to be entered therethrough without having to disconnect the handle 52 from the cable 51 or disconnect the cable 51 from the engine 21. The grip 52 is larger than the inner diameter of eyelet 53 and, therefore, the grip 52 rests in a predetermined position on the top of eyelet 53. An enlarged portion 55 on the shank of bolt 47 abuts the outer side of the control handle position 43 thus serving as a bolt head for the purpose of fastening the handle portions together.

In order to prevent the operator from pulling the starter cable by upward manual movement of the grip 52, a blocking member 61 is provided. The blocking member is a bent wire form which has a shaft portion 62 pivotally connected to the leg 64 of the upper portion 43 of the handle 41 for pivotal movement about an axis 63 transverse to the leg 64. The bent wire blocking member 61 includes a U-shaped abutment portion 66 and a loop portion 67 forming a pivot opening. A control link or rod 68 has a dogleg portion 69 at its lower end forming a pivot connection with the loop portion 67 of the blocking member 61. An upper dogleg portion 71 of the control rod 68 is inserted into an opening 72 in the clutch control element 31 to form a pivot connection therewith.

As shown in FIG. 1, the control element 31 is in a clutch disengaging or drive disestablishing condition and the blocking member 61 is in an upwardly withdrawn or release position permitting the operator to grasp the grip 52 and pull the starter cable to start the engine. The engine shut-off lever 76 is pivoted upwardly to its engine run position shown in FIG. 1 when starting the engine. The lever 76 is connected to an engine shut-off device through a spring biased pull rod 77, shown in FIG. 3, and when the lever 76 is released it pivots downwardly to the position shown in FIG. 2 to shut off the engine.

Figure 4:
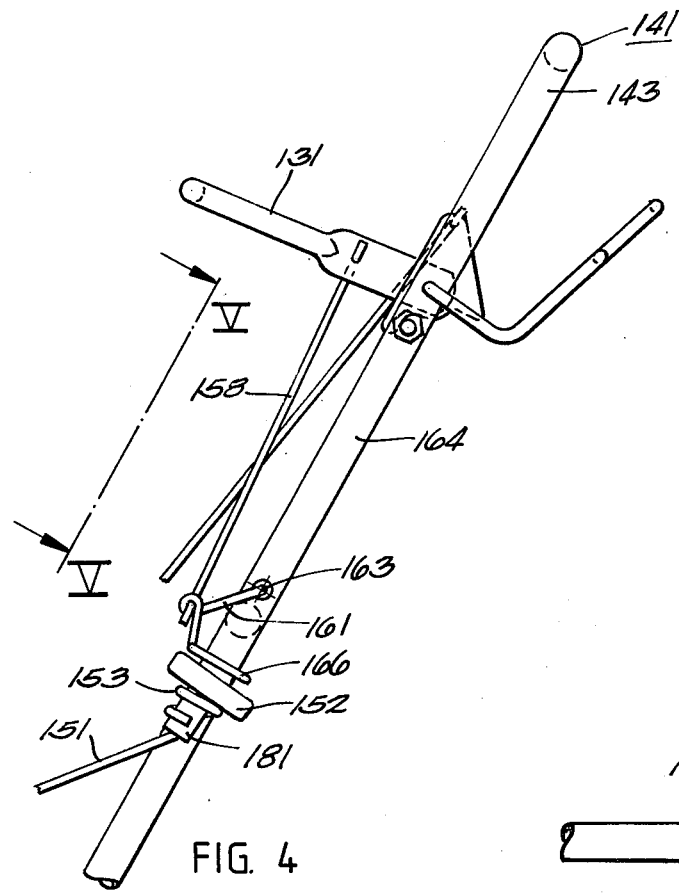
FIG. 4 is a side view of the control handle portion of a walk-behind mower showing a second embodiment of the present invention.
Figure 5:
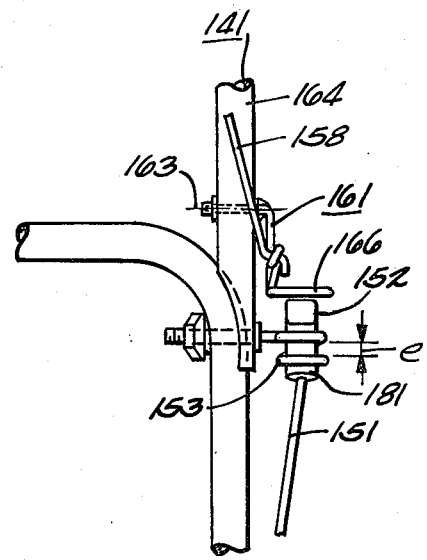
FIG. 5 is a view taken along the line V—V in FIG. 4.

The second embodiment of the invention shown in FIGS. 4-5 includes a blocking member 161 which is pivotally connected to a leg 164 of an upper portion 143 of an operator's handle 141 for swinging movement about an axis 163 transverse to the leg 164. As illustrated, the blocking or abutment portion 166 of the blocking member 161 is in its blocking position preventing a grip 152 attached to a pull start cable 151 from being pulled upwardly from its seat in the form of a helical coil 153. When a clutch control element 131 is pivoted upwardly, a link 158 interconnecting the clutch element 131 and the blocking member 161 will cause the latter to pivot about the axis 163 to a release position in which gripping and pulling of the grip 152 is not hindered by the blocking member. It will be noted in the embodiment shown in FIGS. 4 and 5, a stem portion 181 of the grip 152 fits within the eyelet formed by the coil 153, that is, the stem portion 181 fits within the inner diameter of the coil 153. When the grip 152 is in this seated position and the blocking member 161 is in its illustrated blocking position, the grip 152 is locked in its seated position thereby preventing starting of the engine when the vehicle power train is in a power drive mode. The spacing e between the coils of the helical rod seat 153 is greater than the diameter of the cable 151 thereby permitting the cable 151 to be passed between the coils to thread the eyelet or coil 153 without passing either end of the cable 151 therethrough.

OPERATION

When it is desired to start the lawn mower engine 21, the operator moves lever 76 upwardly and with his right hand grips the lever 76 and the upper part of the control handle 41 or 141. He also pivots the clutch control lever or element 31 or 131 rearwardly to a detented clutch disengaged (drive disestablishing) position illustrated in FIG. 1. In this position the blocking member 61 or 161 will be moved from its blocking position shown in FIGS. 2, 3, 4 and 5, in which pulling of the pull cable is hindered, to its release position, shown in FIG. 1 for blocking member 61, in which the operator can grasp the grip 52 or 152 with his left hand and pull the pull cable to start the engine 21. After starting the engine, the grip 52 or 152 is returned to its seat 53 or 153 where it resides by gravity and under the biasing influence of the recoil spring in the recoil mechanism 54. Mounting the starting cable grip 52 or 152 at an elevated position on the control handle 41 or 141 permits the operator to start the engine while standing at the rear of the control handle 41 or 141. The interlock mechanism herein described prevents pull cable starting of the engine when the mower power drive is engaged.

The embodiments of the invention in which an exclusive property or privilege is claimed are defined as follows:

1. In a wheeled vehicle having at least one drive wheel, an internal combustion engine with a pull type starting mechanism and a drive train connecting the engine to the drive wheel including a clutch device having drive establishing and drive disestablishing conditions, the combination comprising:

a manually operated pull cable connected at one of its ends to said starting mechanism and having a hand grip on its other end, said hand grip being in a predetermined position when said pull cable is not being operated, a control for said clutch device by which the vehicle operator selectively causes said clutch device to be in its drive establishing and drive disestablishing conditions, a blocking member mouted on said vehicle near said pull cable grip shiftable between a release position in which manual gripping and pulling of said grip is unhindered by said blocking member and a blocking position in which manual gripping and pulling of said grip is hindered by said blocking member, and means causing said blocking member to occupy its release position when said clutch device is in its drive disestablishing condition and to occupy its blocking position when said clutch device is in its drive establishing condition.

2. In a walk-behind vehicle having a plurality of wheels, a rearwardly extending control handle for a walking operator, an internal combustion engine with a pull type starting mechanism and a drive train by which the engine may be connected to at least one of said wheels including a clutch device having drive establishing and drive disestablishing conditions, the combination comprising:

a manually operated retractable pull cable connected at one of its ends to said starting mechanism and having a hand grip on its other end, a seat on said handle in supporting relation to said grip when said pull cable is retracted, a control for said clutch device by which the vehicle operator selectively causes said clutch device to be in its drive establishing and drive disestablishing conditions, said control including a manually operable control element mounted on said handle, a blocking member shiftably mounted on said handle for movement between a release position in which manual gripping and pulling of said grip from said seat is unhindered by said blocking member and a blocking position in which manual gripping and pulling of said grip from said seat is hindered by said blocking member, and means responsive to operation of said control element causing said blocking member to occupy its release position when said clutch device is in its drive disestablishing condition and to occupy its blocking position when said clutch device is in its drive establishing condition.

3. The vehicle of claim 2 wherein said seat is mounted sufficiently high on the handle to permit the operator to operate said pull cable to start said engine in a standing position behind the mower.

4. The vehicle of claim 1 wherein said seat includes an eyelet through which said cable extends.

5. The vehicle of claim 4 wherein said seat is a helical coil.

6. The vehicle of claim 5 wherein said grip includes a stem position connected to said cable which fits within said eyelet when said pull cable is retracted.

7. The vehicle of claim 1 wherein said means includes a link interconnecting said control element and said blocking member.

8. The vehicle of claim 7 wherein said control element and said blocking member are pivotally mounted on said control handle.

9. The vehicle of claims 3, 4 or 5 wherein said control handle includes a lower U-shaped portion with downwardly extending legs and an upper U-shaped portion with downwardly extending legs connected to the legs of said lower portion by a pair of releasable fasteners, one of said releasable fasteners including a bolt integrally formed with said seat.

* * * * *